United States Patent
Vaidyanathan et al.

(10) Patent No.: US 11,893,618 B2
(45) Date of Patent: Feb. 6, 2024

(54) SYSTEMS AND METHODS FOR PROVIDING PERSONALIZED DISCOUNTED ITEMS

(71) Applicant: Walmart Apollo, LLC, Bentonville, AR (US)

(72) Inventors: Vivek Vaidyanathan, Sunnyvale, CA (US); Ashish Ranjan, Sunnyvale, CA (US); Yogananth Mahalingam, Fremont, CA (US); Sushant Kumar, San Jose, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 114 days.

(21) Appl. No.: 17/549,710

(22) Filed: Dec. 13, 2021

(65) Prior Publication Data

US 2023/0186366 A1 Jun. 15, 2023

(51) Int. Cl.
*G06Q 30/00* (2023.01)
*G06Q 30/0601* (2023.01)

(52) U.S. Cl.
CPC ..... *G06Q 30/0631* (2013.01); *G06Q 30/0603* (2013.01)

(58) Field of Classification Search
None
See application file for complete search history.

(56) References Cited

U.S. PATENT DOCUMENTS

| | | | |
|---|---|---|---|
| 10,269,021 B2 | 4/2019 | Levy et al. | |
| 10,372,704 B2 | 8/2019 | Brynes et al. | |
| 11,074,635 B2 | 7/2021 | Srinivasan et al. | |
| 11,288,698 B2* | 3/2022 | Rapperport | G06Q 30/0283 |
| 2008/0077459 A1* | 3/2008 | Desai | G06Q 30/02 705/7.29 |
| 2014/0095285 A1* | 4/2014 | Wadell | G06Q 30/00 705/26.7 |
| 2017/0032415 A1* | 2/2017 | Chen | G06Q 30/0249 |
| 2017/0278173 A1 | 9/2017 | Ettl et al. | |
| 2021/0004421 A1 | 1/2021 | Zadorojniy et al. | |
| 2022/0277345 A1* | 9/2022 | Nag | G06N 5/04 |

* cited by examiner

*Primary Examiner* — Mila Airapetian
(74) *Attorney, Agent, or Firm* — Morgan, Lewis & Bockius LLP; Manita Rawat

(57) ABSTRACT

This application relates to apparatus and methods for automatically determining and providing digital recommendations including discounted items with associated savings. In some examples, a computing device obtains savings data including savings items. In response to obtaining the savings data, the computing device obtains a plurality of clusters. Each cluster of the plurality of clusters includes a set of product types. The computing device obtains user data associated with a user, and based on the savings data and the plurality of clusters, determines a set of initial items for recommendation. The set of initial items includes a subset of the savings items. The computing device also determines final recommendation items for the user based on the set of initial items and the user data.

20 Claims, 6 Drawing Sheets

SYSTEMS AND METHODS FOR PROVIDING PERSONALIZED DISCOUNTED ITEMS

TECHNICAL FIELD

The disclosure relates generally to digital recommendations and, more specifically, to electronically determining and providing personalized digital recommendations including discounted or savings items that are relevant to the user.

BACKGROUND

At least some websites, such as retailer websites (e.g., e-commerce platforms), display item recommendations including savings items (e.g., discounted items) that are on sale during a particular time period to entice customers to purchase the savings items at a discounted rate and increase user engagement with the website. For example, a website may display savings item recommendations, and may further allow a customer to purchase recommended items. The displayed recommendations may be determined by recommendation systems, which may attempt to provide recommendations for items which the customer may be interested in. Some websites provide savings items as recommendations in fixed positions, in a global and static manner, for all user, for all transactions. For example, some websites provide savings items at the beginning and/or top of the page prior to other item recommendations determined based on relevancy (e.g., relevant items). However, presenting savings items in fixed positions without optimizing for relevancy may lead to a decreased overall customer interaction when other savings items that the user is more likely to purchase could have been presented in more optimal, easy to notice positions. In this way, in some examples, the item recommendation systems may provide recommendations for savings items that the customer finds irrelevant or is not interested in at positions that the user is most likely to interact with, decreasing the customer engagement and satisfaction with the items that may have been increased with other more relevant savings items recommended in those positions. In some examples, the customer may even be embarrassed by a displayed recommendations, and may lead to a decreased likelihood of the customer engaging and/or purchasing items from the website in the future.

There are also opportunities to address item recommendation systems, particularly related to leveraging similarity between product types for determining item recommendations. For example, current taxonomy has multiple product types that cover heterogeneous items which may be too diverse to be shown on a single theme. Leveraging item information, and historical user transaction and engagement data for a plurality of users to determine more homogenous themes amongst product types may allow for a more robust recommendation system. Further, customers are often looking for deals and savings on items they want to buy. As such, there are opportunities for leveraging popular savings items amongst other users to determine recommendations for a user that the user may never have been able to see otherwise. This may allow for increased customer interaction with a diverse set of items, especially savings items, as a user is more likely to interact with and buy an item that the user has never interacted with when it is on sale.

SUMMARY

The embodiments described herein are directed to automatically determining and providing digital item recommendations with savings items at optimized positions for display, for example, on a website. The embodiments may allow a person, such as a customer, to be presented with item recommendations, including savings items, at optimized positions that may be more likely to interest the customer while also maximizing the quality of the savings represented by the recommendations. For example, the embodiments may allow the person to view recommendations with savings items, at personalized positions, that the person may be more willing to purchase. In some examples, the embodiments may provide ranking processes that rank savings items in an efficient and accurate manner to increase engagement value while maintaining relevancy of the recommendations. The ranking processes may determine the savings items for recommendations and their corresponding positions based on relevancy scores, price, discount amount and/or price bands. In some examples, the recommendations are personalized to each person, e.g., the items selection and their order are personalized to each person. As a result, the embodiments may allow a retailer to present more relevant savings items with item recommendations to each person in more relevant positions, thereby increasing the potential customer satisfaction without compromising the probability that the person will purchase the recommended savings items. In addition, because a person may now spend less time reviewing irrelevant recommendations, the person may have additional time to consider additional items for purchase. Further, instead of randomly choosing savings items to recommend, recommending relevant savings items at optimized positions may increase user engagement with the savings items. In addition to or instead of these example advantages, persons of ordinary skill in the art having the benefit of these disclosures would recognize and appreciate other advantages as well.

In accordance with various embodiments, exemplary systems may be implemented in any suitable hardware or hardware and software, such as in any suitable computing device. For example, in some embodiments, a computing device is configured to obtain savings data including savings items. The computing device is further configured to obtain a plurality of clusters. Each cluster of the plurality of clusters may include a set of product types. Also, the computing device is configured to obtain user data associated with a user. Further, the computing device is configured to determine a set of initial items for recommendation based on the savings data and the plurality of clusters. The set of initial items includes a subset of the savings items. Additionally, the computing device is configured to determine final recommendation items for the user based on the set of initial items and the user data.

In some embodiments, a method is provided that includes to obtaining savings data including savings items. The method also includes obtaining a plurality of clusters. Each cluster of the plurality of clusters includes a set of product types. The method includes obtaining user data associated with a user. Further, the method includes determining a set of initial items for recommendation based on the savings data and the plurality of clusters. The set of initial items includes a subset of the savings items. Additionally, the method includes determining final recommendation items for the user based on the set of initial items and the user data.

In yet other embodiments, a non-transitory computer readable medium has instructions stored thereon, where the instructions, when executed by at least one processor, cause a computing device to perform operations that include obtaining a plurality of clusters. Each cluster of the plurality of clusters includes a set of product types. The operations also include obtaining user data associated with a user. Further, the operations include determining a set of initial items for recommendation based on the savings data and the plurality of clusters. The set of initial items includes a subset of the savings items. Additionally, the operations include determining final recommendation items for the user based on the set of initial items and the user data.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
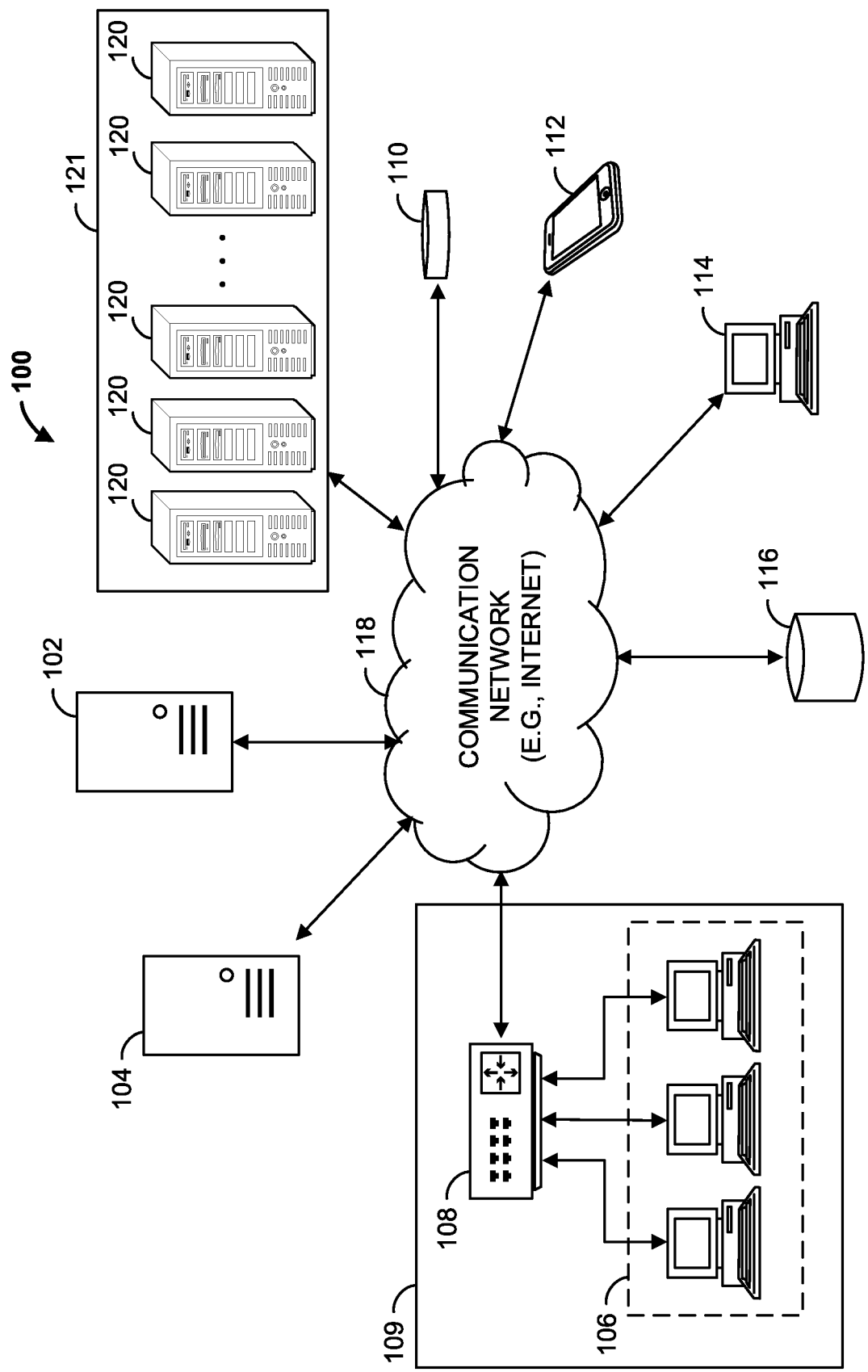
FIG. 1 is a block diagram of an item recommendation system that includes an item recommendation computing device in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of an item recommendation system 100 that includes an discounted item recommendation computing device 102 (e.g., a server, such as an application server), a web server 104, one or more processing devices 120, workstation(s) 106, database 116, and one or more customer computing devices 110, 112, 114 operatively coupled over network 118. Discounted item recommendation computing device 102, web server 104, workstation(s) 106, processing device(s) 120, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit and receive data over communication network 118.

In some examples, each of discounted item recommendation computing device 102 and processing device(s) 120 can be a computer, a workstation, a laptop, a server such as a cloud-based server, or any other suitable device. In some examples, each of processing devices 120 is a server that includes one or more processing units, such as one or more graphical processing units (GPUs), one or more central processing units (CPUs), and/or one or more processing cores. Each processing device 120 may, in some examples, execute one or more virtual machines. In some examples, processing resources (e.g., capabilities) of one or more processing devices 120 are offered as a cloud-based service (e.g., cloud computing). For example, cloud-based network 121 may offer computing and storage resources of one or more processing devices 120 to discounted item recommendation computing device 102.

In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, web server 104 hosts one or more retailer websites. In some examples, discounted item recommendation computing device 102, processing devices 120, and/or web server 104 are operated by a retailer, and multiple customer computing devices 112, 114 are operated by customers of the retailer. In some examples, processing devices 120 are operated by a third party (e.g., a cloud-computing provider).

Workstation(s) 106 are operably coupled to communication network 118 via router (or switch) 108. Workstation(s) 106 and/or router 108 may be located at a store 109, for example. Workstation(s) 106 can communicate with discounted item recommendation computing device 102 over communication network 118. The workstation(s) 106 may send data to, and receive data from, discounted item recommendation computing device 102. For example, the workstation(s) 106 may transmit data identifying items purchased by a customer at store 109 to discounted item recommendation computing device 102.

Although FIG. 1 illustrates three customer computing devices 110, 112, 114, item recommendation system 100 can include any number of customer computing devices 110, 112, 114. Similarly, discounted item recommendation system 100 can include any number of discounted item recommendation computing devices 102, processing devices 120, workstations 106, web servers 104, and databases 116.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

First customer computing device 110, second customer computing device 112, and N$^{th}$ customer computing device 114 may communicate with web server 104 over communication network 118. For example, each of multiple computing devices 110, 112, 114 may be operable to view, access, and interact with a website, such as a retailer's website, hosted by web server 104. Web server 104 may transmit user session data related to a customer's activity (e.g., interactions) on the website. For example, a customer may operate one of customer computing devices 110, 112, 114 to initiate a web browser that is directed to the website hosted by web server 104. The customer may, via the web browser, view discounted item recommendations for currently discounted items displayed on the website, and may click on item advertisements, for example. The website may capture these activities as user session data, and transmit the user session data to discounted item recommendation computing device 102 over communication network 118. The website may also allow the operator to add one or more of the items to an online shopping cart, and allow the customer to perform a "checkout" of the shopping cart to purchase the items. In some examples, web server 104 transmits purchase data identifying items the customer has purchased from the website to discounted item recommendation computing device 102.

In some examples, discounted item recommendation computing device 102 may execute one or more models (e.g., algorithms), such as a machine learning model, statistical model, logarithmic model, language model, etc., to determine recommended discounted items (e.g., items on discount) to advertise to the customer (i.e., discounted item recommendations). Discounted item recommendation computing device 102 may transmit the discounted item recommendations to web server 104 over communication network 118, and web server 104 may display advertisements for one or more of the recommended discounted items on the website to the customer. For example, web server 104 may display the item advertisements to the customer on a homepage, a catalog webpage, an item webpage, a search results webpage of the website (e.g., as the customer browses those respective webpages), or in a personalized email notification.

In some examples, web server 104 transmits a recommendation request (e.g., search request) to discounted item recommendation computing device 102. The recommendation request may identify a recommendation or search query provided by the customer (e.g., via a search bar of the web browser), or a recommendation query provided by a processing unit in response to user adding one or more items to cart or interacting (e.g., engaging) with one or more items. In some examples, the recommendation request may be automatically generated by the web server 104 upon a customer visiting the website. In other examples, the recommendation request may be automatically generated by the web server 104 upon a user logging into the website or an app associated with the retailer. In yet other examples, the recommendation request may be automatically generated for one or more of the retailer's customers at a predetermined time (e.g., 9 am on Monday), at predetermined time intervals (e.g., every week), or when a new set of discounted items are released by the retailer. In response to receiving the request, item recommendation computing device 102 may execute the one or more processors to determine search results or recommendation results to display to the customer (i.e., discounted item recommendations). Discounted item recommendation computing device 102 may transmit the results to web server 104 over communication network 118. Web server 104 may display the results on a results webpage or in an email, for example.

Discounted item recommendation computing device 102 is further operable to communicate with database 116 over communication network 118. For example, discounted item recommendation computing device 102 can store data to, and read data from, database 116. Database 116 can be a remote storage device, such as a cloud-based server, a disk (e.g., a hard disk), a memory device on another application server, a networked computer, or any other suitable remote storage. Although shown remote to discounted item recommendation computing device 102, in some examples, database 116 can be a local storage device, such as a hard drive, a non-volatile memory, or a USB stick. Discounted item recommendation computing device 102 may store purchase data received from web server 104 in database 116. Discounted item recommendation computing device 102 may also receive from web server 104 user session data identifying events associated with browsing sessions, and may store the user session data in database 116. Database 116 may also store, and transmit to discounted item recommendation computing device 102, catalog data identifying and characterizing a plurality of items sold by the retailer. Database 116 may further store, and transmit to discounted item recommendation computing device 103, savings data identifying and characterizing a plurality of items on sale (e.g., discounted items) by the retailer at any given time.

In some examples, discounted item recommendation computing device 102 generates feature vectors for a plurality of models (e.g., machine learning models, statistical models, algorithms, etc.) based on item catalog data, savings data, historical user session data, historical purchase data, and current user session data for the user and/or items. Discounted item recommendation computing device 102 trains the models based on their corresponding feature vectors, and discounted item recommendation computing device 102 stores the models in a database, such as in database 116 (e.g., cloud storage).

The models, when executed by discounted item recommendation computing device 102, allow discounted item recommendation computing device 102 to determine discounted item recommendations for one or more items on sale to advertise to a customer. For example, discounted item recommendation computing device 102 may obtain the models from database 116. Discounted item recommendation computing device 102 may then receive, in real-time from web server 104, current user session data identifying real-time events of the customer interacting with a website (e.g., during a browsing session). In response to receiving the user session data, item recommendation computing device 102 may execute the models to determine item recommendations for items on sale (e.g., sale items, discounted items) to display to the customer.

In some examples, discounted item recommendation computing device 102 receives current user session data from web server 104. The user session data may identify actions (e.g., activity) of the customer on a website. For example, the user session data may identify item impressions, item clicks, items added to an online shopping cart, conversions, click-through rates, item recommendations viewed, and/or item recommendations clicked during an ongoing browsing session (e.g., the user data identifies real-time events). Discounted item recommendation computing device 102 may generate discounted item recommendations based on the user session data, historical user data (e.g., historical user transaction data, historical user engagement data), active discounted items (e.g., savings items) available, potential revenues for savings items (e.g., item cost), item price band, item popularity, item discount amount, item catalogs, etc. For example, discounted item recommendation computing device 102 may determine relevant savings items for recommendation as an initial matter based on a price-based algorithm that filters the savings items based on price, discounted price, product type of the item, and/or price band. The savings items may then be re-ranked for each product type based on customer preferences to user session data, and historical user data. Further, product types may be ranked based on the historical user data, and the highest ranking product type may be used to select savings items within the product type to present to the user, with the savings items further ranked and subsequently selected based on the historical user data. In this way, discounted item recommendation computing device 102 may then select discounted item recommendations that provide include quality savings items that are relevant to the customer.

In some examples, the tensors are generated based on semantic similarities between the items (e.g., savings and non-savings items). For example, discounted item recommendation computing device 102 may generate the tensors based on a universal sentence encoding using a semantic similarity model that encodes and embeds item attributes such as title, brand, department, category, etc. (e.g., metadata) of the items as extracted by analyzing the catalogs and/or merchant provided product information for each item. For example, discounted item recommendation computing device 102 may generate the tensors based on catalog data for all items (e.g., savings items, non-savings items) as stored in database 116.

In some examples, discounted item recommendation computing device 102 may also generate tensors based on semantic similarities between items (e.g., savings items, non-savings items). The tensors may be used to rank and score all items based on relevancy to a specific product type (e.g., product type cluster) based on pervious user transaction data for all customers of the retailer. For example discounted item recommendation computing device 102 may use the tensors to generate a plurality of clusters (e.g., product types) that each include a subset of all items in the catalog data.

In some examples, discounted item recommendation computing device 102 may also generate tensors based on initial prices of savings items including items on sale from the retailer to make sure that the items that are obtained from the savings data are of a good quality savings deal. Discounted item recommendation computing device 102 may determine an initial set of discounted items to recommend to be a subset of the savings items, such that each of the initial discounted items are present in at least one cluster. Discounted item recommendation computing device 102 mat also generate tensors based on price, discount and price band filters to generate the initial set of discounted items. The initial set of discounted items for recommendation may then determine initial profits, scores and/or ranks for the items based on the quality and discount scores of items (e.g., profit margin scores, cost-per-click scores for each item).

Further, discounted item recommendation computing device 102 may generate tensors based on semantic similarities between items (e.g., savings items, initial set of discounted items). The tensors may be used to rank and score all savings items based on relevancy to the user based on historical user data (e.g., historical user purchases, user session data) for the particular user. The initial set of discounted items for recommendation may then be re-ranked or re-scored based on user preferences and habits to generate final set of discounted items for recommendation.

Discounted item recommendation computing device 102 may provide the tensors (e.g., embeddings) as required by each machine learning models. The machine learning models may include, for example, neural networks, deep neural networks, decision tree models, regression models, random forest models, statistical models, stochastic models, or any other suitable models.

In some examples, discounted item recommendation computing device 102 assigns the models (or parts thereof) for execution to one or more processing devices 120. For example, each model may be assigned to a virtual machine hosted by a processing device 120. The virtual machine may cause the models or parts thereof to execute on one or more processing units such as GPUs. In some examples, the virtual machines assign each model (or part thereof) among a plurality of processing units.

Based on the output of the models, discounted item recommendation computing device 102 may generate discounted item recommendations for items (e.g., subset of discounted or savings items) to be advertised on the website. For example, discounted item recommendation computing device 102 may transmit the discounted item recommendations to web server 104, and web server 104 may display the recommend discounted items to the customer.

In some examples, item recommendation computing device 102 may rank savings items for recommendation based on quality of the savings items, the savings associated with the items, the diversity of the savings items and the relevance of the savings items to the corresponding customer of the retailer. For example, the savings items chosen for recommendation may be dependent on relevancy of the item to the user, the savings per purchase of each savings item, the potential profit per purchase of each item, the user session, and the position that the item is shown in the recommendations.

In some examples, discounted item recommendation computing device 102 may inject promotional items (e.g., sponsored items) within relevant items such that the contribution profit (e.g., total profit) increases without compromising on relevancy of the recommendations. Item recommendations computing device 102 may compute total profits of each potential combination of relevant items and promotional items by adding total reward (e.g., profit margin) and total contribution (e.g., cost-per-click value) for all combinations. Discounted item recommendation computing device 102 may then select the combination with the maximal total profit as the item recommendations to present to the user. Item recommendation computing device 102 may select balance the need for selecting a correct and relevant subset of all available items and optimizing for all different possible permutations of all positions available for presenting the selected subset of items (e.g., recommended items).

Discounted item recommendation computing device 102 may obtain a total number of recommendations (e.g., savings items) that can be presented to the user (e.g., page limit) and the positions within the page (or carousel, pane) to present the recommendations. Note that the total number of positions will equal the total number of recommendations (e.g., page limit, carousel limit). As an initial matter, the discounted item recommendation computing device 102 may determine an initial set of savings items from a plurality of current items on sale based on one or more of factors, such as, a threshold quality of the discount associated with the savings items, product types associated with each of the items on sale, price of the savings items, discount associated with the savings items and/or price band associated with the savings items. For example, discounted item recommendation computing device 102 may obtain and/or receive a plurality of items that are currently on sale by the retailer from database 116. A price-based algorithm may be used to determine a set of the savings items that include a discount above a pre-determined threshold indicating that the item discounts are of a pre-determined quality. In some examples, the set of savings items may be further filtered based on product types included in clusters defining all items that are sold by the retailer.

For example, discounted item recommendation computing device 102 may obtain and/or receive catalog data including all items sale by the retailer from database 116. Each item may be associated with a product type. Each product type may include a plurality of items that belong to that product type. In some examples, the items in database 116 may be stored in associated with their corresponding product types. The product types may be determined from catalog data. The catalog data may include, for each item, shelf information, indicating a context for the items and/or how the item appears within the website or in a store. For example, desks may be associated with the shelf, /Home/Furnitures/Office Furniture/Shop All Desks/*. As such, desks may be associated with a hierarchical categorization where the desk may be located within Home as the primary node, followed by Furnitures, Office Furniture, and Shop All Desks as subsequent child nodes. As another example, the item, "Bedroom Furniture Set" may be associated with shelf "/Home/Furniture/Bedroom Furniture/Bedroom Sets/," and item "Jewelry Armoire" may be associated with shelf "/Home/Décor/*.

In some examples, discounted item recommendation computing device 102 may generate clusters of items based on their corresponding shelfs. For example, a cluster, "Furniture" may include all product types within the shelf "/Home/Furnitures/*" and the subsequent child nodes. Further, discounted item recommendation computing device 102, in some examples, may score each cluster between 0 and 1 indicating an accuracy the items and/or product types belonging in the corresponding cluster based on a machine learning model trained to determine the scores based on the item information for each item and comparing the items in the clusters based on their semantic meanings. Discounted item recommendation computing device 102 may further improve the cluster score for each cluster by removing and/or adding product types (and corresponding items) that do not belong in the corresponding cluster in order to push the score for each cluster to close to 1. For example, initial cluster score for cluster "Furnitures" may be determined to be 0.74, and based on applying the machine learning product, it may be determined that product type "Game & Card Tables" (e.g., within shelf "Home/Furnitures/Game & Card Tables/*) may be better suited for the cluster "Sports & Outdoors," and product type "Room Dividers & Panel Screens" (e.g., within shelf "Home/Furnitures/Room Dividers & Panel Screens/*) may be better suited for the cluster "Home Décor." Discounted item recommendation computing device 102 may then remove the product types "Game & Card Tables" and "Room & Panel Screens" and move them to clusters "Sports & Outdoors," and "Home Décor" respectively. In this way, the cluster score for "Furniture" may be increased from the initial 0.74 to 0.94, for example. Further, product types (and their corresponding items) including "Coffee Tables" and "Shoe Cabinets" may be added to cluster "Furnitures," based on application of the machine learning model determining that those product types are more closely related to other product types and items in the cluster "Furnitures," than their respective initial clusters (and/or shelves).

Similarly, discounted item recommendation computing device 102 may determine that product type "Swimming Pools" (e.g., within shelf "Home and garden Misc/Patio and Garden/Swimming Pools*) may be better suited for cluster "Sports and Outdoors", and product type "Firewood" (e.g., within shelf "Home and garden Misc/Patio and Garden/Firewood*) may be better suited for cluster "Home improvement" than their current cluster "Patio and Garden." Discounted item recommendation computing device 102 may then remove the product types "Swimming Pools" and "Firewood" from cluster "Patio and Garden" and move them to clusters "Sports and Outdoors" and "Home improvement respectively." In this way, the cluster score for "Patio and Garden" may be increased from initial 0.76 to 0.9, for example. In another example, product types "Dishwasher Detergents," "Laundry Detergents," and "Air Fresheners" may be moved from their original cluster "Cleaning Products" to their respective new clusters "Detergents," "Laundry" and "Household essentials" to increase the score of cluster "Cleaning Products" from 0.35 to 0.88. Further, product types (and their corresponding items) including "Carpet Cleaners," "Kitchen Cleaners," and "Cleaning Gloves" may be added to cluster "Cleaning Products," based on application of the machine learning model determined that those product types are more closely related to other product types and items in the cluster "Cleaning Products," than their respective initial clusters (and/or shelves).

Discounted item recommendation computing device 102 may determine final clusters using the machine learning model. Each cluster may include a plurality of product types. Each savings item available by the retailer may further be associated with a product type. Discounted item recommendation computing device 102 may initially filter the available savings items to remove items not associated with a product type included in at least one cluster. Discounted item recommendation computing device 102 may further determine an initial set of savings items for recommendation based on applying the savings items to a machine learning model trained to score and/or rank the savings items based on one or more of price, discount and price band filters when compared to the savings items. The initial set of savings items for recommendation may include a subset of all savings items available for sale by the retailer.

In some examples, discounted item recommendation computing device 102 may determine a set of relevant savings items from the initial set of savings items based on user data (e.g., current user session data, historical transaction data, historical user session data, etc.) including relevant items with positions (e.g., ranks) based on relevancy. The number of relevant savings items in the set of relevant savings items may be equal to the total number of available positions (e.g., total number recommendations allowed per page, carousel, and/or pane). In some examples, the initial set of savings items may be ranked based on customer affinity scores of the particular customer (e.g., user) to specific brand, flavor, and/or price for the corresponding clusters and/or product types associated with the savings items. For example, for each cluster and for each product type within the cluster, the savings items within that cluster and product type may be ranked based on customer affinity scores stored in database 116 for price, brand and/or flavor for each item. A final ranking and/or score for each savings item may be determined based on the customer affinity scores available for each savings item, In some examples, discounted item recommendation computing device 102 may determine a final set of discounted recommendation items from the relevant saving items by diversifying the highest ranked relevant savings items. A diversification savings algorithm may be used on the set of relevant savings items that confirms no two product types end up dominating the set of discounted recommendation items, and confirms that two very similar items don't end up in the savings corner model. The diversification algorithm remove savings items from the relevant savings items when the number of savings items in the relevant savings items belonging to a product type is higher than a predetermined threshold. In such examples, the savings items removed may be lower ranked than the ones kept within the final set of discounted recommendation items. In other examples, the diversification algorithm may use a semantic similarity algorithm to remove an item that is similar to another savings item with a higher ranking and/or score. The final set of discounted items for recommendation may then include highest ranked relevant saving items with less than a predetermined items from a single product type, and with items sufficiently different from other included items. The carousel, page and/or pane limit may determine the number of savings items in the final set of discounted items for recommendations. Top final ranked savings items from the set of relevant savings items may be selected as final set of relevant savings items such that no product type dominates the recommended items and no two similar items are presented to the customer.

Discounted item recommendation computing device 102 may then select the final set of discounted items as the discounted item recommendations to present to the customer (e.g., user). Discounted item recommendation computing device 102 may provide to the web browser 104 the items in the selected set of discounted items and the associated positions for the items. Web browser 104 may then present the discounted item recommendations to the customer with the selected items in the selected positions from the final set of discounted items. In this way, discounted item recommendation computing device 102 may maximize a quality and diversity of savings items presented to a customer while maintaining the relevancy of the recommendations to the customer in a computationally efficient manner by reducing the number of permutations required to generate the recommendations, and in turn saving computational power required to generate discounted items recommendations.

Among other advantages, the embodiments allow for real-time inferencing of multiple models to generate discounted item recommendations for a particular customer based on balancing the need for maximizing quality and diversity of recommendations, meeting the maximum sponsored items constraints for a website page, not compromising the relevancy of the recommendations for increased customer satisfaction. Distributing processing tasks prior to the current session, based on previously trained and saved embeddings, allows for more consistent throughput consistency, as well as a reduction in overall processing time. Moreover, the distribution of processing tasks allows for the use of more computationally intensive models, such as neural networks, which can capture non-linear relationships from trained data and may be better suited to estimate relationships on unseen data (e.g., real-time data). Further, the embodiments leverage the understanding that customers often look for deals and savings on items they want to buy to identify customers who have likelihood to engage in discounted items, select items eligible for discounts, present the most relevant ones of the discounted items to customers in a relevant carousel/theme, and automatically generate and assign carousels/themes using the on machine learning models.

Figure 2:
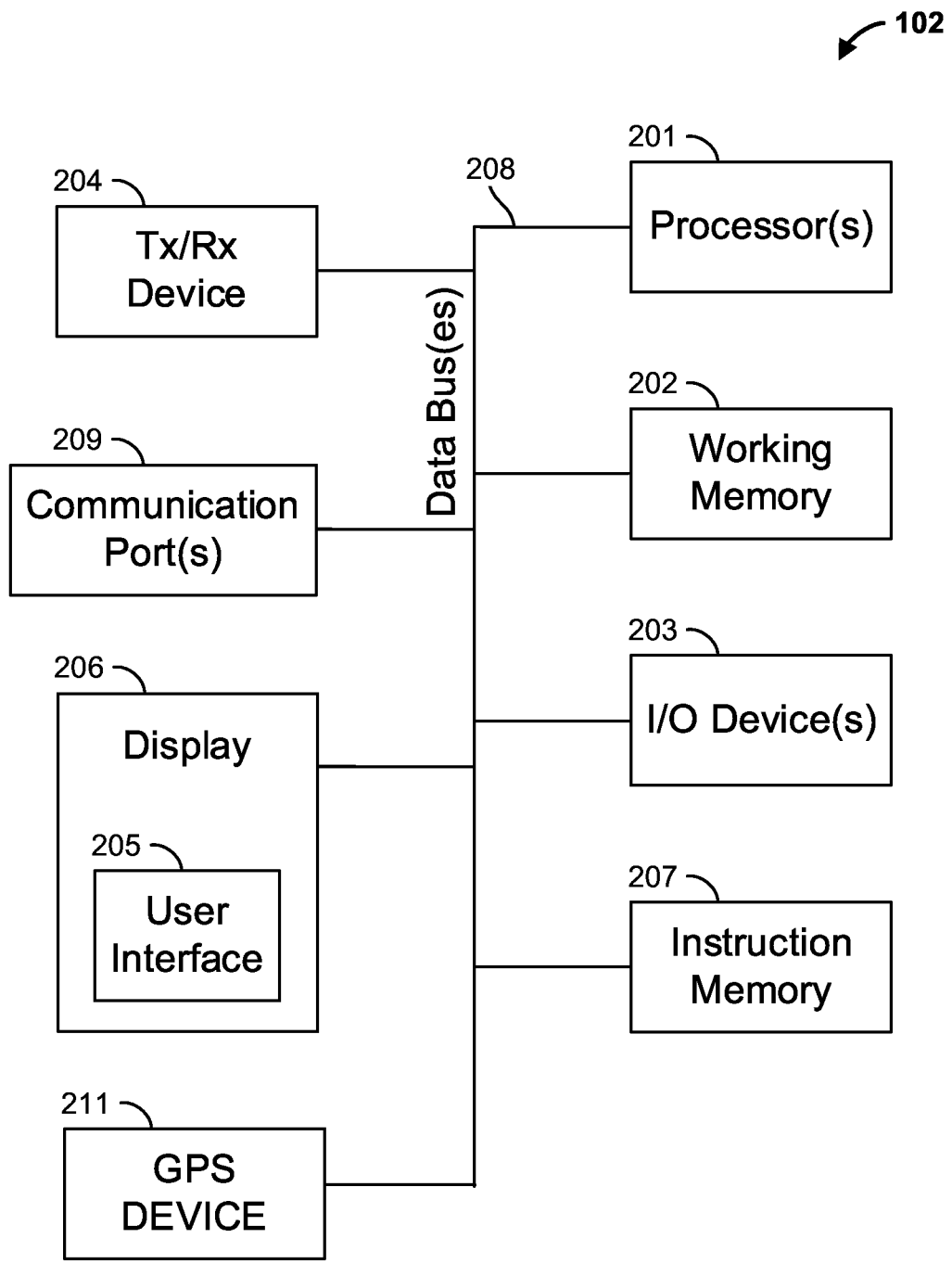
FIG. 2 is a block diagram of the discounted item recommendation computing device of FIG. 1 in accordance with some embodiments.

FIG. 2 illustrates the discounted item recommendation computing device 102 of FIG. 1. Discounted item recommendation computing device 102 can include one or more processors 201, working memory 202, one or more input/output devices 203, instruction memory 207, a transceiver 204, one or more communication ports 209, a display 206 with a user interface 205, and a global positioning system (GPS) device 211, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. Processors 201 can be configured to perform a certain function or operation by executing code, stored on instruction memory 207, embodying the function or operation. For example, processors 201 can be configured to execute code stored in instruction memory 207 to perform one or more of any function, method, or operation disclosed herein.

Additionally, processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of discounted item recommendation computing device 102. Working memory 202 can be a random-access memory (RAM) such as a static random-access memory (SRAM) or dynamic random-access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning model training data.

Display 206 can be any suitable display, and may display user interface 205. User interfaces 205 can enable user interaction with discounted item recommendation computing device 102. For example, user interface 205 can be a user interface for an application of a retailer that allows a customer to view and interact with a retailer's website. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 discounted item recommendation computing device 102 will be operating in. Processor(s) 201 is operable to receive data from, or send data to, a network, such as communication network 118 of FIG. 1, via transceiver 204.

GPS device 211 may be communicatively coupled to the GPS and operable to receive position data from the GPS. For example, GPS device 211 may receive position data identifying a latitude, and longitude, from a satellite of the GPS. Based on the position data, item recommendation computing device 102 may determine a local geographical area (e.g., town, city, state, etc.) of its position. Based on the geographical area, discounted item recommendation computing device 102 may determine relevant trend data (e.g., trend data identifying events in the geographical area).

Figure 3:
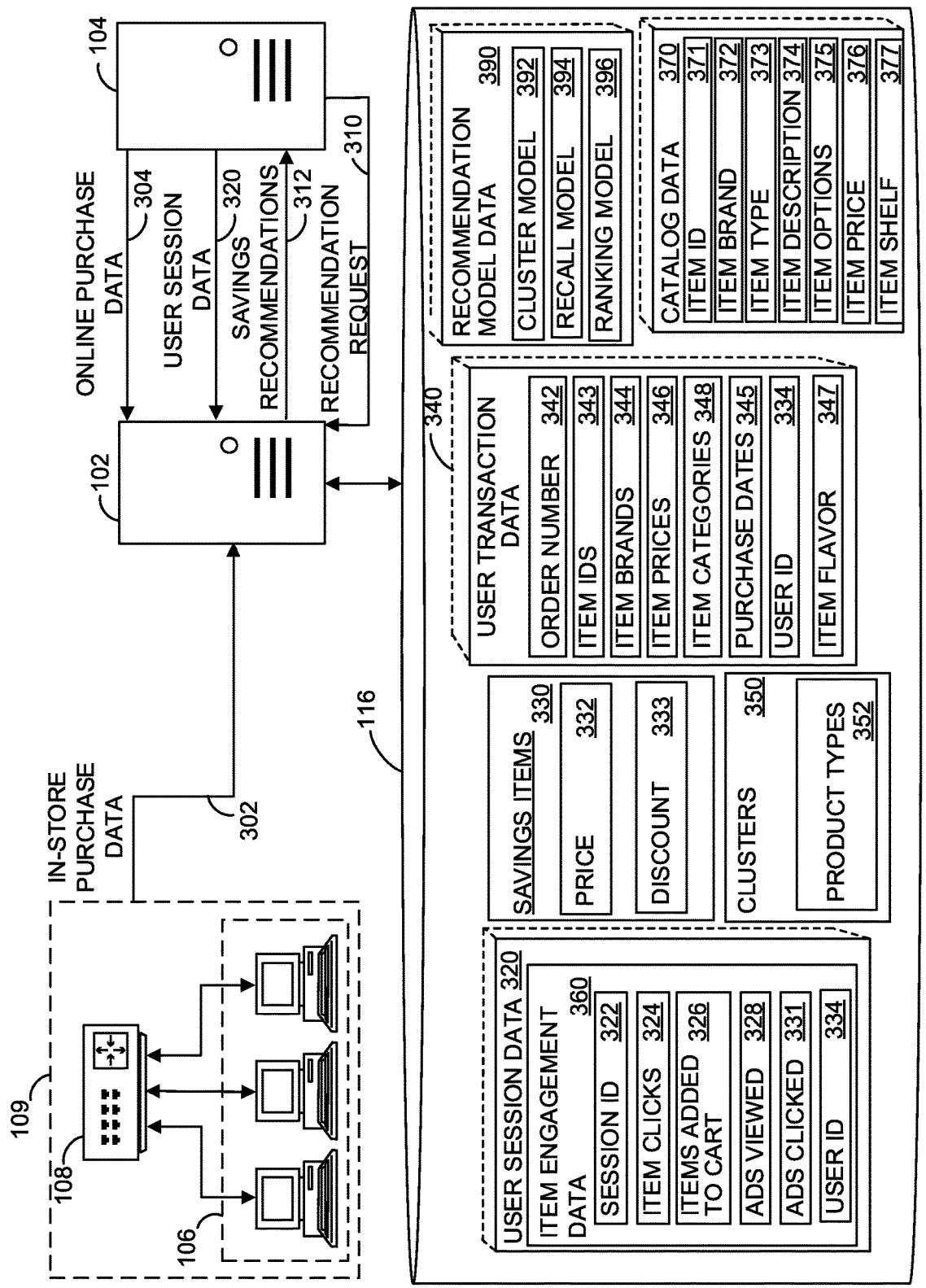
FIG. 3 is a block diagram illustrating various portions of the item recommendation system of FIG. 1 in accordance with some embodiments.

FIG. 3 is a block diagram illustrating examples of various portions of the item recommendation system 100 of FIG. 1. As indicated in the figure, discounted item recommendation computing device 102 may receive user session data 320 from web server 104, and store user session data 320 in database 116. User session data 320 may identify, for each user (e.g., customer), data related to that user's browsing session, such as when browsing a retailer's webpage hosted by web server 104.

In this example, user session data 320 may include item engagement data 360. Item engagement data 360 may include one or more of a session ID 322 (i.e., a website browsing session identifier), item clicks 324 identifying items which the user clicked (e.g., images of items for purchase, keywords to filter reviews for an item), items added-to-cart 326 identifying items added to the user's online shopping cart, advertisements viewed 328 identifying advertisements the user viewed during the browsing session, advertisements clicked 331 identifying advertisements the user clicked on, and user ID 334 (e.g., a customer ID, retailer website login ID, a cookie ID, etc.).

Discounted item recommendation computing device 102 may also receive online purchase data 304 from web server 104, which identifies and characterizes one or more online purchases, such as purchases made by the user via a retailer's website hosted by web server 104. Discounted item recommendation computing device 102 may also receive in-store purchase data 302 from store 109, which identifies and characterizes one or more in-store purchases including item identifiers and prices.

Discounted item recommendation computing device 102 may parse in-store purchase data 302 and online purchase data 304 to generate user transaction data 340. In this example, user transaction data 340 may include, for each purchase, one or more of an order number 342 identifying a purchase order, item IDs 343 identifying one or more items purchased in the purchase order, item brands 344 identifying a brand for each items purchased, item flavors 347 for each of the items purchased, item prices 346 identifying the price of each item purchased, item types 348 identifying a type (e.g., category) of each item purchased, a purchase date 345 identifying the purchase date of the purchase order, and user ID 334 for the user making the corresponding purchase.

Database 116 may further store catalog data 370, which may identify one or more attributes of a plurality of items, such as a portion of or all items a retailer carries. Catalog data 370 may identify, for each of the plurality of items, an item ID 371 (e.g., an SKU number), item brand 372, item type 373 (e.g., grocery item such as milk, clothing item), item description 374 (e.g., a description of the product including product features, such as ingredients, benefits, use or consumption instructions, or any other suitable description), item options 375 (e.g., item colors, sizes, flavors, etc.), item price 376 (e.g., the retail price of the item), and/or item shelf 377 (e.g., hierarchical item location data).

Database 116 may also store savings items 330, which may identify and categorize each savings item (e.g., discounted item) available at the retailer's website. Savings items 330 may include data related to savings items and their corresponding discount (e.g., discounted price) 333, indicating corresponding discount that is provided by the retailer for the savings item as compared to their corresponding retail price, and price 332 indicting the price (e.g., retail price) of the savings item.

Additionally, database 116 may store clusters 350, which may identify and categorize product types into clusters. Each cluster may also be associated with corresponding product types 352 and each product types may be associated with a plurality of items of that product type. Each cluster of clusters 350 may also be associated with a cluster score indicating whether the product types in the cluster are closely related to other product types of the cluster. scores indicating a relevancy of the items to the particular customer. Clusters 350 may be determined and/or generated using cluster model 392 also stored in database 116. Cluster model 392 may determine clusters 350, their corresponding product types 352, and their corresponding scores based on catalog data 370, specifically, item description and item shelf 377, user session data 320, user transaction data 340 for all customer of the retailer. Any known clustering model may be used to determine the clusters 350 and their corresponding product types. Clusters 350 may include data indicating a set of clusters that are determined prior to the current user session by cluster model 350 for all product types in catalog data 370. In some examples, data types 352 for each cluster in clusters 350 may be selected from and determined based on catalog data 370 based on item type 373 and shelf 377 for each item in catalog data 370.

Database 116 may also store recommendation model data 390 identifying and characterizing one or more machine learning models. For example, recommendation model data 390 may include the clusters model 392, a recall model 394, and a ranking model 396. Each of the clusters model 392, recall model 394, and ranking model 396 may be one or more machine learning models trained based on corresponding tensors (e.g., embedding vectors, feature vectors) generated by discounted item recommendation computing device 102.

In some examples, discounted item recommendation computing device 102 receives (e.g., in real-time) user session data 320 for a customer interacting with a website hosted by web server 104. In response, discounted item recommendation computing device 102 generates discounted item recommendations 312 identifying recommended items to advertise to the customer, and savings recommendation 312 to web server 104. In other examples, discounted item recommendation computing device 102 receives a recommendation request 310 from the web browser 104 from a customer interacting with a website hosted by web browser 310. In response, discounted item recommendation computing device 102 generates savings recommendations 312 identifying recommended savings items to advertise to the customer, and transmits savings recommendations 312 to web server 104 for presentation to the user using user device 112.

For example, discounted item recommendation computing device 102 may assign each of the cluster model 392, recall model 394, and ranking model 396 (or parts thereof) to a different processing unit or virtual machines hosted by one or more processing devices 120. Moreover, discounted item recommendation computing device 102 may generate tensors based at least on the received user session data 320 (e.g., the user session data 320 received in real-time) for the customer, the user transaction data 340 (e.g., the user transaction data 340 from prior or historical user sessions), catalog data 370 and savings items 330 as required by each of the cluster model 392, recall model 394, and ranking model 396. In some examples, discounted item recommendation computing device 102 generates the tensors based on the received user session data 320, and one or more of the following: historical user session data 320 for the customer, historical user transaction data 340 for the customer, clusters 350, and savings items 330, for each of the cluster model 392, recall model 394, and ranking model 396. Discounted item recommendation computing device 102 may provide (e.g., transmit) the tensors to the processing units accordingly, and the processing units may execute the models based on the provided tensors (e.g., inferencing).

Further, discounted item recommendation computing device 102 may obtain the output (e.g., output data, output tensors) of each of the cluster model 392, recall model 394, and ranking model 396 from the processing units, and generate the savings recommendation 312 based on the outputs of the models. For example, discounted item recommendation computing device 102 may use recall model 394 to leverage the output of the cluster model 392 (e.g., clusters 350) and the savings items 330 to determine an initial set of savings items for recommendation based on, among other things, price, discount amount, price, price band, and product type of the corresponding savings items. The ranking model 396 may determine final set of savings items for recommendation as relevant savings items relevant to the customer as a subset of the initial set of savings items and/or re-ranked initial set of savings items based on user transaction data 340 and user session data 320 associated with the particular customer to present to the user as savings recommendations 312 based on a combination of the model outputs. The discounted item recommendations 312 may then be generated as the combination of the model outputs.

Figure 4:
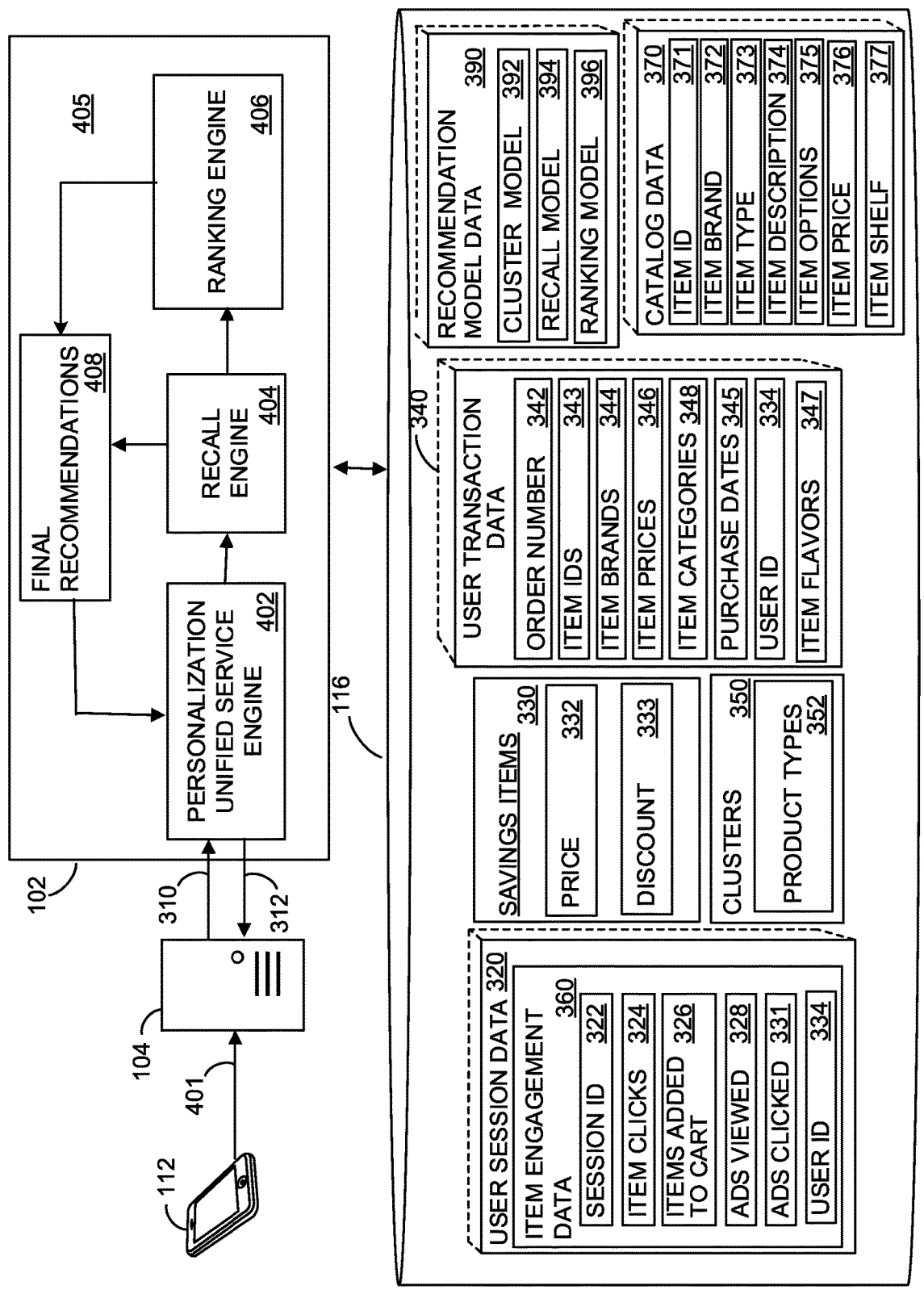
FIG. 4 is a block diagram illustrating various portions of the discounted item recommendation computing device of FIG. 1 in accordance with some embodiments.

FIG. 4 is a block diagram illustrating a more detailed view of discounted item recommendation computing device 102. Specifically, discounted item recommendation computing device 102 includes personalization unified service engine 402, recall engine 404, and ranking engine 406. In some examples, one or more of personalization unified service engine 402, recall engine 404, and ranking engine 406 are implemented in hardware. In some examples, one or more of personalization unified service engine 402, recall engine 404, and ranking engine 406 are implemented as an executable program maintained in a tangible, non-transitory memory, such as instruction memory 207 of FIG. 2, which may be executed by one or processors, such as processor 201 of FIG. 2. For example, personalization unified service engine 402 may obtain from database 116 recommendation request 310 as a message 401 from user device 112 via web server 104 and may execute recommendation model(s) included in the recommendation model data 390.

In this example, web server 104 transmits a recommendation request 310 to discounted item recommendation computing device 102. Recommendation request 310 may include a request for savings item recommendations for presentation to a particular user using the user device 112. In some examples, recommendation request 310 further identifies a user (e.g., customer) for whom the savings recommendations are requested at web server 104. Personalization unified service engine 402 receives recommendation request 310, and receives and parses the user session data 320 (e.g., user session data associated with a current user session of the user in real-time). Personalization unified service engine 402 provides the user session data to the recall engine 404, and/or ranking engine 406, and other data, which may include the user transaction data 340, user session data 320 (e.g., user session data from historical user sessions), savings items 330, and clusters 350 extracted from database 116.

Recall engine 404 can determine one or more savings items as initial set to recommend to the user based on user session data 320 and the user transaction data 340 associated with all customers of the retailer, savings items 330, clusters 350. Recall engine 404 may use the output of cluster model 392 to further determine the initial set of savings items to recommend to the customer by removing savings items from the set that are associated with product types not included in any of clusters 350. Recall engine 404 may further use a price based algorithm to determine savings items that are of or above a threshold quality based on item popularity, price, discount amount, and price band of each of the savings items. In some examples, recall engine 404 may further use a thresholding algorithm to threshold the savings items included in the initial set to a predetermined number based on constraints on the maximum number of savings items that can be provided on the website page in every pane, every carousel, and/or every page. Recall engine 404 generates ranked (e.g., positions) set of savings items identifying and characterizing savings items determined to be of relevance to customers of the retailer and of a predetermined quality to allow for a threshold potential profit from sale of the savings items. Recall engine 404 may provide the initial set of savings items (e.g., with corresponding savings item data) to ranking engine 406.

Ranking engine 406 can determine final savings recommendations 312 and item positions based historical user data associated with the user, including but not limited to user transaction data 340 and user session data 320 stored in database 116 in associated with the user (e.g., using user id 334). Ranking engine 406 may rank initial set of savings items based on user flavor, price, and/or brand for each savings items associated with each product type within each cluster to generate the savings recommendations 312. Ranking engine 406 may determine the optimal positions for the savings items (or portion thereof) to be recommended. Final recommendations 408 may be generated by ranking engine 406 for savings recommendations. The final recommendations 408 may be a subset of the initial set of savings items and their corresponding positions (e.g., ranks) in the savings recommendations as determined by the ranking engine 408 to provide a personalized list of savings items to a user that balances quality of savings items, and maximum profit from savings items, with the relevance of the savings items to the particular user.

Final recommendations 408 can determine an ordered list of the savings recommendations 312 based on the final rankings of savings items to be recommended received from the ranking engine 406. Final recommendations 408 may generate data that identifies the order and/or positions of savings recommendations 312 associated with the particular user (e.g., customer) to optimize user interactions with and user purchases of savings items in the recommendations.

Personalization unified service engine 402 may receive the savings recommendations 312 from the final recommendations 408 in a data format (e.g., message) acceptable by web server 104. Personalization unified service engine 402 transmits the savings recommendations 312 to web server 104. Web server 104 may then update or generate savings recommendations for presentation to the user via the user device 112 based on the final recommendations 408.

Figure 5:
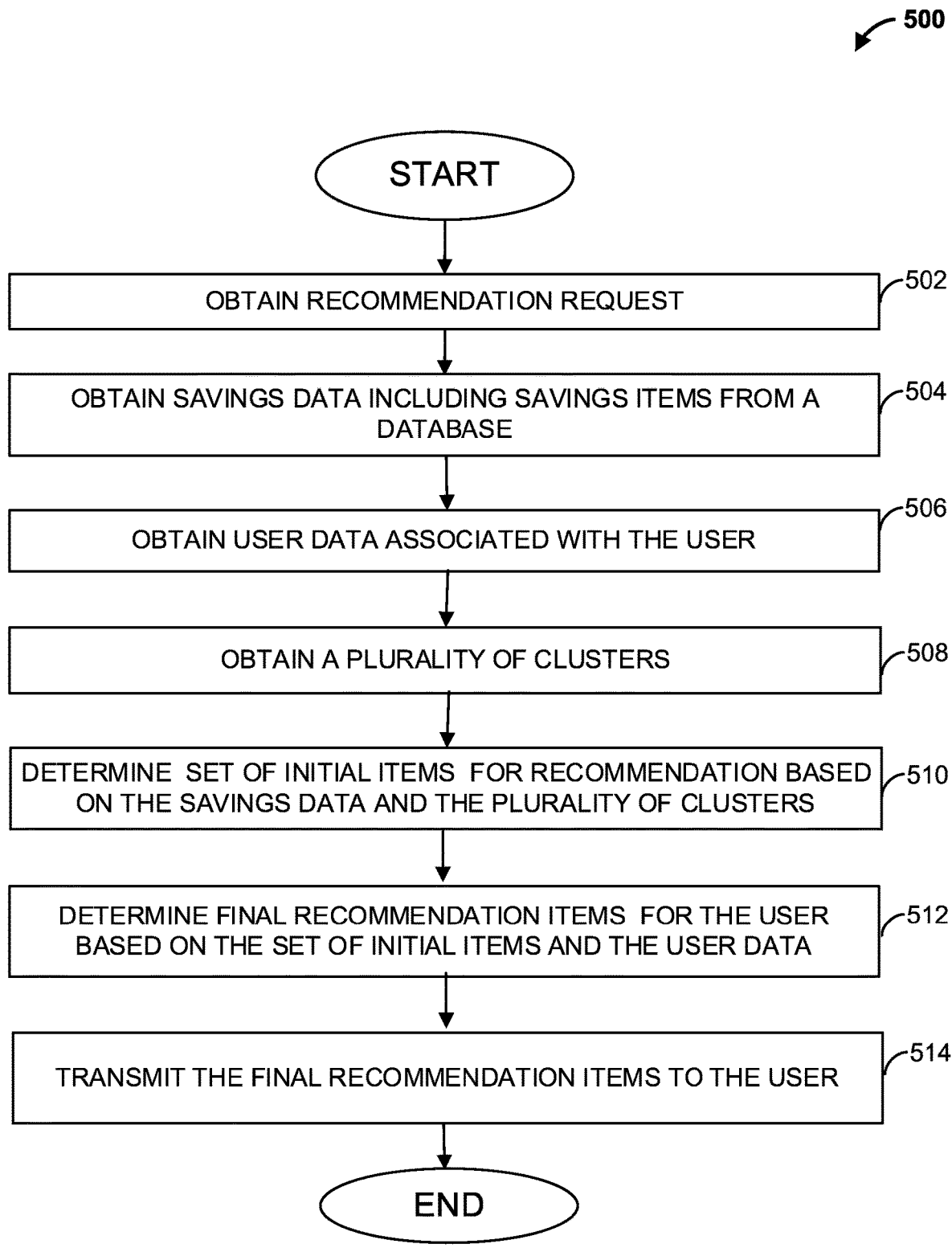
FIG. 5 is a flowchart of an example method that can be carried out by the discounted item recommendation computing device of FIG. 1 in accordance with some embodiments.

FIG. 5 is a flowchart of an example 500 that can be carried out by the item recommendation system 100 of FIG. 1. Beginning at step 502, one or more recommendation requests are received related to a user. For example, discounted item recommendation computing device 102 may receive a recommendation request 310 from web server 104. At step 504, savings data including savings items are obtained from a database. For example, savings items 330 are obtained from database 350 which may include data associated with a plurality of savings items (e.g., items in discount) on sale by the retailer. Each saving item may be associated with, one or more of, a product type (e.g., item type), a discount amount, a price, a brand, a flavor, etc.

At step 506, user data associated with the user is obtained. For example, discounted item recommendation computing device 102 may obtain user session data 320 and user transaction data 340 associated with the user from database 116. At step 508, a plurality of clusters are obtained. Each cluster includes a set of product types. For example, discounted item recommendation computing device 102 may obtain clusters 550 from database 116. Each cluster of clusters 550 is associated with product types 352.

At step 510, a set of initial items are determined for recommendation based on the savings data and the plurality of clusters. The set of initial items includes a subset of the savings items. For example, initial set of savings items for recommendation are determined using recall engine 404 based on savings items 330 and clusters 350. The initial set of savings items for recommendation may include a subset of savings items 330. At step 512, final recommendation items are determined for the user based on the set of initial items and the user data. For example, ranking engine 406 may rank the initial set of savings recommendations based on the user session data 320 and user transaction data 340 associated with the user. Final recommendations 408 may be determined based on the rankings.

At step 514, the final recommendation items are transmitted to the user. For example, discounted item recommendation computing device 102 may transmit the savings recommendations 312 to web server 104 for presentation to the user via user device 112. The method then ends.

Figure 6:
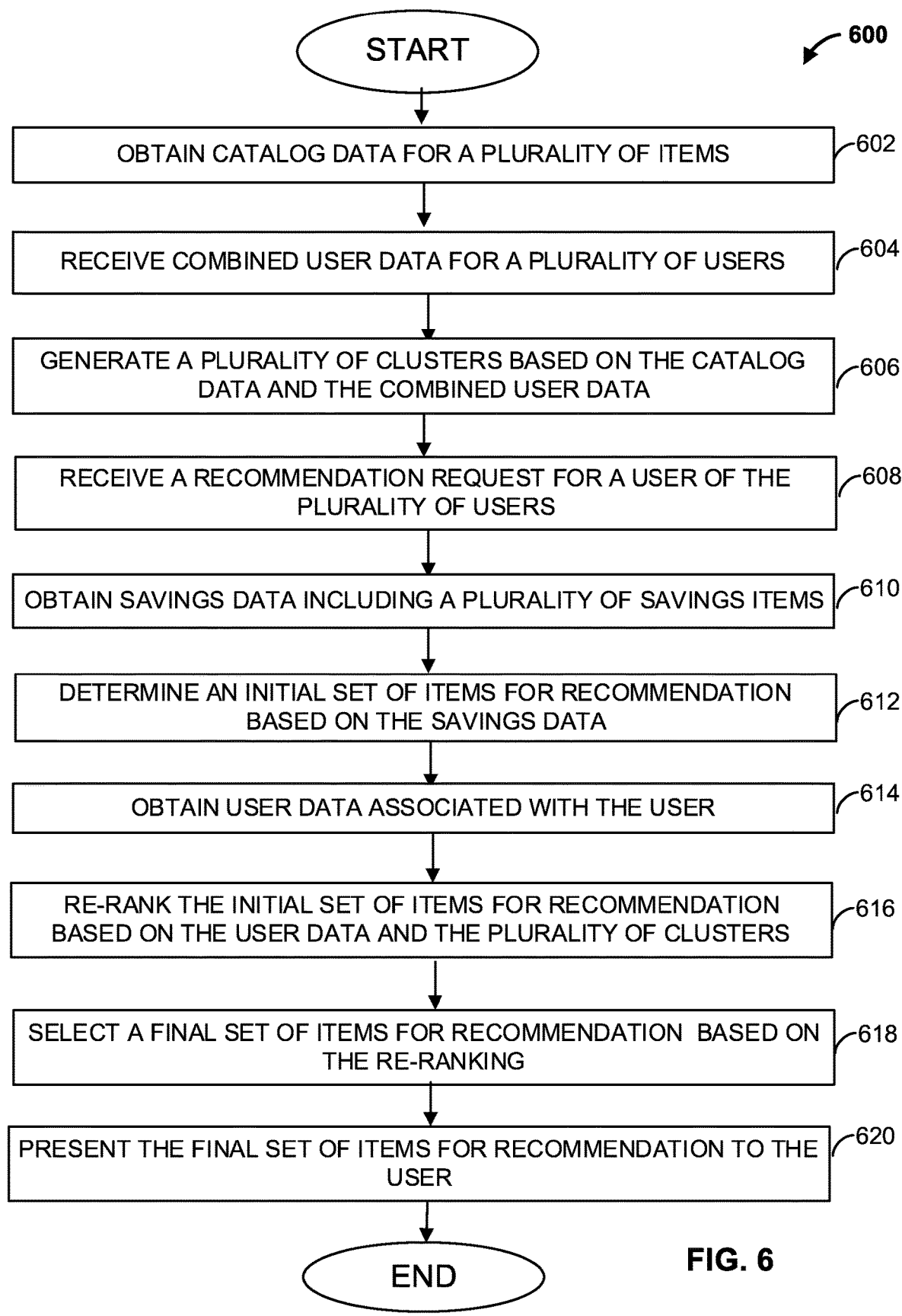
FIG. 6 is a flowchart of another example method that can be carried out by the discounted item recommendation computing device of FIG. 1 in accordance with some embodiments.

FIG. 6 is a flowchart of an example method 600 that can be carried out by the item recommendation system 100 of FIG. 1. At step 602, a computing device, such as discounted item recommendation computing device 102, obtains catalog data for a plurality of items available for sale by a retailer. The catalog data includes, for each item, shelf data, product type, price, and/or product description. For example, discounted item recommendation computing device 102 may receive catalog data 370 from database 370, including for each item for sale by the retailer, item description 374, item type 373, item price 376 and shelf 377. At step 604, combined user data for a plurality of users of the retailer is received. For example, discounted item recommendation computing device may receive user data (e.g., user transaction data 340, user session data 320) associated with a plurality of users of the retailer from database 116.

At step 606, a plurality of clusters are generated using a machine learning model and based on the catalog data and the combined user data. Each cluster includes a plurality of product types. For example, clusters 350 may be generated by cluster model 392 based on the user data for plurality of users of the retailer and the catalog data. Cluster model may be a machine learning model. At step 608, discounted item recommendation computing device 102, receives a recommendation request for a user of the plurality of users. For example, discounted item recommendation computing device 102 may receive a recommendation request 310 from web server 104.

At step 610, savings data including a plurality of savings items is obtained. For example, savings items 330 may be obtained by discounted item recommendation computing device 102. Savings items 330 may include all items that are under discount by the retailer during the current time period. At step 612, discounted item recommendation computing device may determine an initial set of items for recommendation based on the savings data. The initial set of items for recommendations includes a subset of the plurality of savings items. For example, recall model 694 may generate an initial set of savings items for recommendation based on savings items 330. The initial set of savings items may be a subset of the savings items 330.

At step 614, user data associated with the user is received from a database. For example, discounted item recommendation computing device 102 may obtain the user session data and/or user transaction data associated with the user from database 116, which stores user session data 320 and user transaction data 340 for a plurality of users. In some examples, user data may include user preferences for brand, price, and/or flavor for items and/or product types. At step 616, the initial set of items for recommendation are re-ranked based on the user data and the plurality of clusters. For example, ranking engine 406 may re-rank the initial set of items based on clusters 350 and user data (e.g., user session data 320, user transaction data 340) associated with the user.

At step 618, a final set of items for recommendation is selected based on the re-ranking. For example, ranking engine 406 may generate final recommendations 408 for the user based on re-ranking the initial set of items. At step 620, the final set of items for recommendation is presented to the user, via a user interface. For example, ranking model 396 may generate savings recommendations 312 for presentation to the user based on re-ranking. Discounted item recommendation computing device 102 may transmit the savings recommendations 312 to web server 104 for presentation to the user via user device 112. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a computing device configured to:
obtain savings data including savings items;
obtain, by a discounted item recommendation model and based on semantic similarities between a plurality of items, a plurality of clusters, each cluster of the plurality of clusters includes a set of product types;
obtain user data associated with a user;
determine, by the discounted item recommendation model, a set of initial items for recommendation based on the savings data and the plurality of clusters, the set of initial items includes a subset of the savings items; and
determine, by the discounted item recommendation model, final recommendation items for the user based on the set of initial items and the user data.

2. The system of claim 1, wherein the computing device is further configured to:
obtain catalog data including the plurality of items, each item of the plurality of items associated with a product type of the set of product types and shelf data;
obtain combined user data associated with a plurality of users; and
generate the plurality of clusters based on the catalog data and the combined user data.

3. The system of claim 2, wherein the savings items include a subset of the plurality of items of the catalog data that are on sale during a current time period.

4. The system of claim 1, wherein the user data associated with the user includes historical user transaction data and historical user session data of the user.

5. The system of claim 1, wherein the initial set of items for recommendation is further determined based on the plurality of clusters.

6. The system of claim 1, wherein the initial set of items for recommendation is determined by filtering for one or more of a price, a price band, and a discount amount associated with each of the savings items.

7. The system of claim 1, wherein the computing device is further configured to:
rank each item of the initial set of items based on the user data, the user data including one or more of a user brand preference, a user price preference, and a user flavor preference for at least one product type of the plurality of product types; and
determine the final recommendation items for the user based at least in part on the ranks of each item of the initial set of items.

8. The system of claim 1, wherein each of the final recommendation items are associated with a different product type of the plurality of product types.

9. The system of claim 1, wherein each of the final recommendation items are semantically different from each other.

10. The system of claim 1, wherein the user data associated with the user includes user-affinity scores for corresponding savings items, the user-affinity scores including one or more of a user-brand score, a user-price score, and a user-flavor score for the corresponding savings items.

11. A method comprising:
obtaining savings data including savings items;
obtaining, by a discounted item recommendation model and based on semantic similarities between a plurality of items, a plurality of clusters, each cluster of the plurality of clusters includes a set of product types;
obtaining user data associated with a user;
determining, by the discounted item recommendation model, a set of initial items for recommendation based on the savings data and the plurality of clusters, the set of initial items includes a subset of the savings items; and
determining, by the discounted item recommendation model, final recommendation items for the user based on the set of initial items and the user data.

12. The method of claim 11, the method further comprising:
obtaining catalog data including the plurality of items, each item of the plurality of items associated with a product type of the set of product types and shelf data;
obtaining combined user data associated with a plurality of users; and
generating the plurality of clusters based on the catalog data and the combined user data.

13. The method of claim 12, wherein the savings items include a subset of the plurality of items of the catalog data that are on sale during a current time period.

14. The method of claim 11, wherein the user data associated with the user includes historical user transaction data and historical user session data of the user.

15. The method of claim 11, wherein the initial set of items for recommendation is further determined based on the plurality of clusters.

16. The method of claim 11, wherein the initial set of items for recommendation is determined by filtering for one or more of a price, a price band, and a discount amount associated with each of the savings items.

17. The method of claim 11, the method further comprising:
ranking each item of the initial set of items based on the user data, the user data including one or more of a user brand preference, a user price preference, and a user flavor preference for at least one product type of the plurality of product types; and
determining the final recommendation items for the user based at least in part on the ranks of each item of the initial set of items.

18. A non-transitory computer readable medium having instructions stored thereon, wherein the instructions, when executed by at least one processor, cause a device to perform operations comprising:
- obtaining savings data including savings items;
- obtaining, by a discounted item recommendation model and based on semantic similarities between a plurality of items, a plurality of clusters, each cluster of the plurality of clusters includes a set of product types;
- obtaining user data associated with a user;
- determining, by the discounted item recommendation model, a set of initial items for recommendation based on the savings data and the plurality of clusters, the set of initial items includes a subset of the savings items; and
- determining, by the discounted item recommendation model, final recommendation items for the user based on the set of initial items and the user data.

19. The non-transitory computer readable medium of claim 18, the operations further comprising:
- obtaining catalog data including the plurality of items, each item of the plurality of items associated with a product type of the set of product types and shelf data;
- obtaining combined user data associated with a plurality of users; and
- generating the plurality of clusters based on the catalog data and the combined user data.

20. The non-transitory computer readable medium of claim 18, the operations further comprising:
- ranking each item of the initial set of items based on the user data, the user data including one or more of a user brand preference, a user price preference, and a user flavor preference for at least one product type of the plurality of product types; and
- determining the final recommendation items for the user based at least in part on the ranks of each item of the initial set of items.

* * * * *